(12) United States Patent
Dozier et al.

(10) Patent No.: US 8,597,054 B2
(45) Date of Patent: Dec. 3, 2013

(54) CAN BUS AUTOMATIC LINE TERMINATION

(75) Inventors: Ross E. Dozier, Wildwood, MO (US); Jeffrey Stephen Beam, Wood River, IL (US); Eric Topp, St. Louis, MO (US)

(73) Assignee: Schneider Electric IT Corporation, West Kingston, RI (US)

( * ) Notice: Subject to any disclaimer, the term of this patent is extended or adjusted under 35 U.S.C. 154(b) by 345 days.

(21) Appl. No.: 13/042,041

(22) Filed: Mar. 7, 2011

(65) Prior Publication Data

US 2012/0231663 A1  Sep. 13, 2012

(51) Int. Cl.
*H01R 13/66* (2006.01)

(52) U.S. Cl.
USPC ............... 439/620.04; 439/188; 439/676

(58) Field of Classification Search
USPC ................... 439/620.04, 188, 676
See application file for complete search history.

(56) References Cited

U.S. PATENT DOCUMENTS

| | | | |
|---|---|---|---|
| 6,065,985 A | 5/2000 | Marshall | |
| 6,587,968 B1 | 7/2003 | Leyva | |
| 6,639,383 B2 | 10/2003 | Nelson et al. | |
| 7,312,628 B2 | 12/2007 | Houston et al. | |
| 7,843,676 B2 | 11/2010 | Klikic et al. | |
| 2004/0161964 A1 | 8/2004 | Liebenow | |
| 2004/0167732 A1 | 8/2004 | Spitaels et al. | |
| 2006/0203834 A1 | 9/2006 | Augustinus | |
| 2006/0234564 A1 | 10/2006 | Pharn et al. | |
| 2007/0078635 A1 | 4/2007 | Rasmussen et al. | |
| 2009/0106606 A1* | 4/2009 | Duan et al. | 714/48 |
| 2009/0138313 A1 | 5/2009 | Morgan et al. | |
| 2009/0309570 A1 | 12/2009 | Lehmann et al. | |

FOREIGN PATENT DOCUMENTS

EP  2 166 717 A1  3/2010

OTHER PUBLICATIONS

International Search Report for PCT/US2012/026252 mailed May 31, 2012.

* cited by examiner

*Primary Examiner* — Javaid Nasri
(74) *Attorney, Agent, or Firm* — Lando & Anastasi, LLP (57) ABSTRACT

A network interface includes a receptacle configured to receive a plug, a first contact and a second contact each disposed in the receptacle, and a combination of a resistive element and a normally closed switch arranged in series with each other. The combination is coupled between the first contact and the second contact, and has a first configuration in which the switch is opened responsive to a presence of the plug within the receptacle, and a second configuration in which the switch is closed responsive to an absence of the plug from the receptacle.

20 Claims, 10 Drawing Sheets

CAN BUS AUTOMATIC LINE TERMINATION

BACKGROUND OF THE INVENTION

1. Field of the Invention

Embodiments of the present invention relate to Controller Area Network (CAN or CAN bus) circuits and to automatic termination apparatus and methods.

2. Discussion of Related Art

The Controller Area Network (CAN) is a network bus standard that allows several devices, or nodes, to communicate with each other on a CAN bus in an ad hoc (e.g., point-to-point) manner. If the CAN bus is not properly terminated, signals transmitted by each device on the bus are subject to noise distortions and data corruption caused by signal reflections. Typically, resistors (e.g., 120 ohm resistors) are placed at each end of the bus to reduce or eliminate the signal reflections. A terminating resistor is conventionally included in a modular plug, which is installed in a complementary receptacle, or jack, on a node at one end of the bus. Thus, two terminating plugs are typically used for each CAN bus. One such plug is a terminating resistance package for RJ45 ports, part number 0W04161, sold by American Power Conversion Corporation of Kingston, R.I., the assignee of the present disclosure.

BRIEF SUMMARY OF THE INVENTION

According to one embodiment of the present disclosure, a network interface includes a receptacle configured to receive a plug, a first contact and a second contact each disposed in the receptacle, and a combination of a resistive element and a normally closed switch arranged in series with each other. The combination is coupled between the first contact and the second contact, and has a first configuration in which the switch is opened responsive to a presence of the plug within the receptacle, and a second configuration in which the switch is closed responsive to an absence of the plug from the receptacle.

In another embodiment, the switch may include the first contact. The first contact may be movable from a first position to a second position responsive to the presence of the plug within the receptacle. The switch may be closed when the first contact is in the first position, and the switch may be open when the first contact is in the second position. In yet another embodiment, the first contact may be movable from the second position to the first position responsive to the absence of the plug from the receptacle.

In another embodiment, the switch may include the second contact. The second contact may be movable from a third position to a fourth position responsive to the presence of the modular plug within the receptacle. The second contact may be movable from the fourth position to the third position responsive to the absence of the plug from the receptacle.

In another embodiment, the switch may include a microswitch. In yet another embodiment, the network interface may include a lever coupled to the switch and configured to open the switch responsive to an insertion of the modular plug into the receptacle. In yet another embodiment, the lever may be configured to close the switch responsive to a removal of the modular plug from the receptacle.

In another embodiment, the receptacle includes an RJ45 jack. In another embodiment, the resistive element includes a 120-ohm resistor. In another embodiment, the network interface may be included in a device configured to communicate on a Controller Area Network (CAN).

According to one embodiment of the present disclosure, a network interface includes a receptacle configured to receive a plug, a first contact and a second contact each disposed in the receptacle, a resistive element selectively coupled between the first contact and the second contact for providing resistive termination between the first contact and the second contact, and means for detecting the presence and absence of the modular plug in the receptacle, coupling the resistive element between the first contact and the second contact responsive to detecting the absence of the plug, and decoupling the resistive element from at least one of the first contact and the second contact responsive to detecting the presence of the plug.

In another embodiment, the network interface may include a switch coupled in series to the resistive element for switchably coupling the resistive element between the first contact and the second contact. In another embodiment, the switch may include the first contact. The first contact may be movable from a first position to a second position responsive to the presence of the plug within the receptacle. The switch may be closed when the first contact is in the first position, and the switch may be open when the first contact is in the second position.

In another embodiment, the receptacle may include an RJ45 jack. In another embodiment, the resistive element may include a 120-ohm resistor.

According to one embodiment of the present disclosure, a method of terminating a communication bus within a network interface includes detecting a presence of a plug within a receptacle of the network interface, disabling resistive termination between a first contact of the receptacle and a second contact of the receptacle by switchably decoupling a resistive element from at least one of the first contact and the second contact responsive to detecting the presence of the plug within the receptacle, detecting an absence of the plug within the receptacle, and enabling resistive termination between the first contact and the second contact by switchably coupling the resistive element between the first contact and the second contact responsive to detecting the absence of the plug within the receptacle.

In another embodiment, disabling resistive termination may include moving the first contact from a first position to a second position responsive to detecting the presence of the plug within the receptacle. The first contact in the first position may be switchably coupled to the resistive element, and the first contact in the second position may be switchably decoupled from the resistive element. In yet another embodiment, enabling resistive termination may include moving the first contact from the second position to the first position responsive to detecting the absence of the plug within the receptacle.

In another embodiment, disabling resistive termination may include mechanically opening a switch coupled in series to the resistive element in response to an insertion of the modular plug into the receptacle. In yet another embodiment, enabling resistive termination may include mechanically closing the switch in response to a removal of the modular plug from the receptacle.

BRIEF DESCRIPTION OF THE DRAWINGS

In the drawings, each identical or nearly identical component that is illustrated in various figures is represented by a like numeral. For purposes of clarity, not every component may be labeled in every drawing. For a better understanding of the present disclosure, reference is made to the figures which are incorporated herein by reference and in which.

DETAILED DESCRIPTION OF THE INVENTION

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The disclosure is capable of other embodiments and of being practiced or carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof, as well as additional items.

In one conventional method of terminating a CAN bus, termination plugs are manually installed into the jacks of devices at each physical end of the bus. In another conventional method, one or more lines of the CAN bus are dedicated to detecting the presence or absence of one or more cables, such as described in U.S. Pat. No. 7,312,628 to Houston et al. If not properly terminated, improper operation of the CAN bus is likely to occur (e.g., lost data, communication failure, decreased data speed, and so forth). It is appreciated that troubleshooting CAN bus communication problems can be difficult for many end-users. For example, if an end-user adds or removes devices from the bus, the existing termination plugs may need to be moved to new locations to account for the changed topology of the bus. Often, end-users are not aware of the reasons for improper bus operation and/or attempt to operate the devices without properly installing the termination plugs.

According to at least one embodiment of the present disclosure, a new technique for automatic termination of a CAN bus includes a jack assembly that is configured to automatically enable termination of the CAN bus when the jack is unused or empty (e.g., when there is no plug installed in the jack), and to automatically disable termination when a plug is inserted into the jack. Typically, the jacks at each end of the CAN bus are unused (e.g., not connected to anything); therefore, an empty jack is nearly always available to serve as a termination point at one end of the CAN bus. According to various embodiments, it is appreciated that the jack can be configured to detect the presence or absence of a plug, and to disable or enable termination of the bus accordingly, using a physical mechanism incorporated into the jack, including a resistive element and a switch for switching the resistive element into or out of the communication line path.

Figure 1:
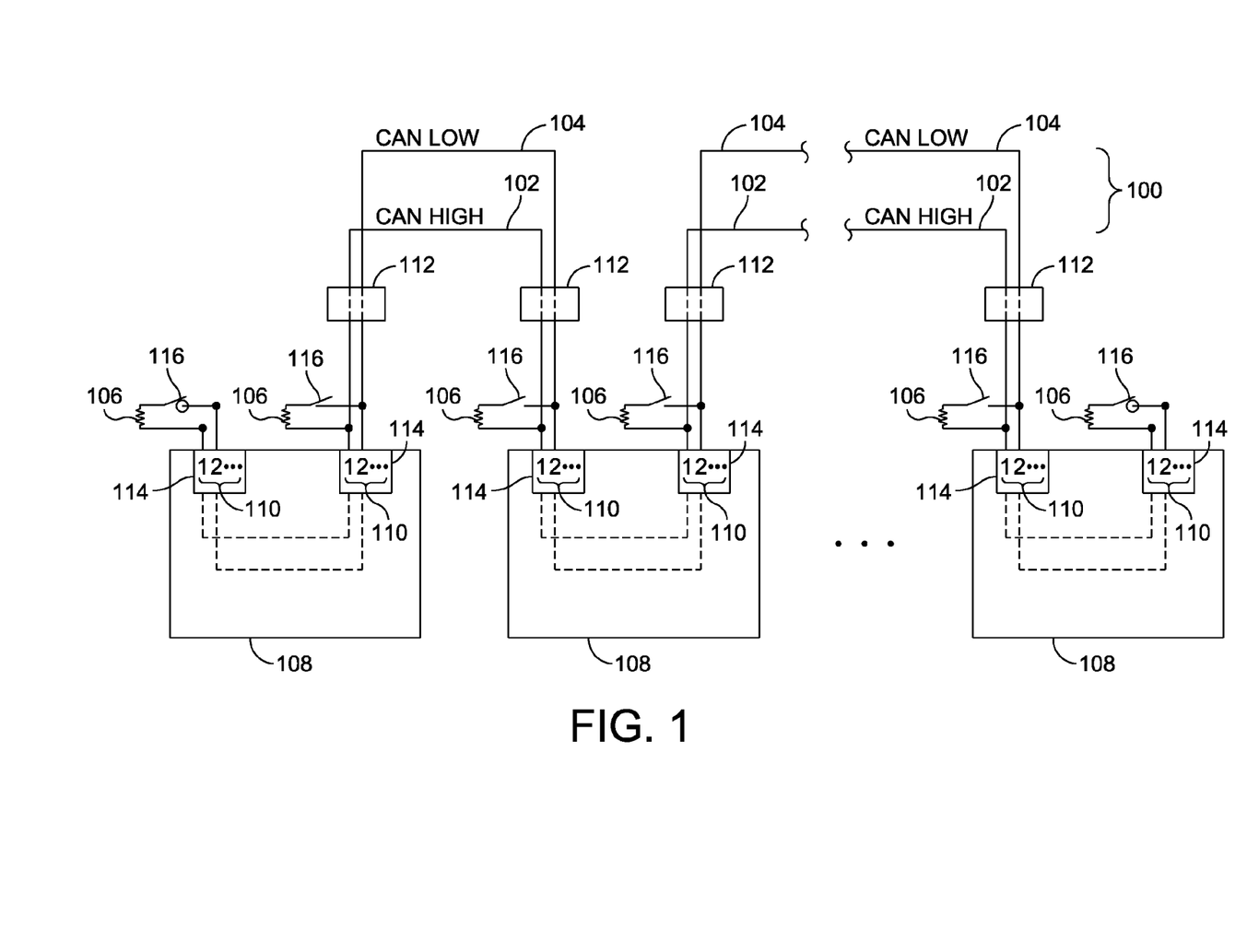
FIG. 1 is a schematic diagram of a CAN bus in accordance with one embodiment of the disclosure.

FIG. 1 is a schematic diagram of a CAN bus 100 in accordance with one embodiment of the present disclosure. The CAN bus 100 includes two communication lines, a CAN High line 102, a CAN Low line 104. The communication lines 102 and 104 may be implemented, at least in part, using network cables (e.g., coaxial or twisted pair) and/or hardwired connections, such as signal traces on a printed circuit board. One or more devices or nodes 108 each have at least one jack 114 (e.g., a modular RJ45 jack) with eight (8) electrical contacts or pins 110, numbered Pins 1-8 (only Pins 1 and 2 are shown in FIG. 1). In other embodiments, different jack configurations may be utilized having different pin arrangements or a different number of pins (e.g., RJ11). The nodes 108 may include a network configuration circuit or microprocessor (not shown) to support CAN bus communications.

The exemplary embodiment of FIG. 1 shows each node 108 having two jacks 114 to accommodate a daisy-chain network topology, although a node may have only one jack or more than two jacks. The CAN bus 100 is detachably coupled to one or more of the nodes 108 through plugs 112 (e.g., a modular RJ45 plug) installed in a respective one of the jacks 114. When a plug 112 is installed in a jack 114, Pin 1 of each jack is coupled to the CAN High line 102, and Pin 2 of each jack is coupled to the CAN Low line 104. Also coupled to each jack is a resistor 106 and a switch 116 (e.g., a normally-closed switch). Any number of nodes may be coupled to the CAN bus. Because the topology of the CAN bus is serial, one node will be located at each end of the bus. Accordingly, at least one jack 114 on each of the end nodes will be unused (e.g., no plug is installed in the jack).

Each end of the CAN bus 100 is terminated by the resistor 106 of the unused jack 114. In one embodiment, the resistor 106 and/or the switch 116 is integral to the jack 114 of each node 108, such as within or attached to a jack housing or body. In another embodiment, the resistor 106 and/or the switch may be located on, for example, a printed circuit board. The resistor 106 is connected to the CAN High line 102 and the CAN Low line 104 when the respective jack 114 of each node 108 is unused and the switch 116 is closed; otherwise, the resistor 106 is disconnected from the CAN bus 100 by opening the switch 116. The action of opening and closing the switch 116 can be, in some embodiments, a function of the presence or absence of a plug in the jack. For example, if the plug is present in the jack, the switch will open; otherwise, the switch will close. For illustrative purposes, FIG. 1 shows the switches 116 of the unused jacks as being closed, and the switches of the used jacks as being open. The resistors 106 may be, for example, 120-ohm resistors, or any elements configured to provide an electrical resistance suitable for terminating the CAN bus 100. In some embodiments, the switch may be, for example, a single-pole, normally closed, momentary switch disposed on the jack, a microswitch, or other switching device. In one embodiment, Pin 1 and/or Pin 2 of each jack 114 are used as the switch 116, as will be described below, for example, with respect to FIGS. 3A and 3B.

Figure 2:
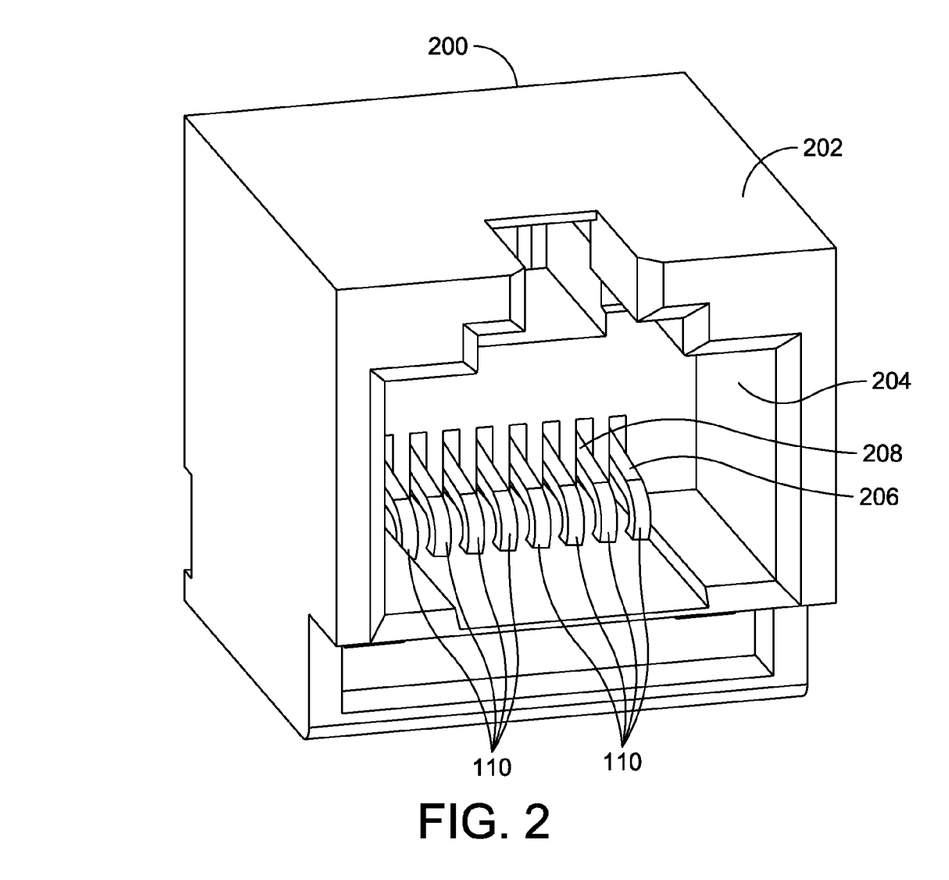
FIG. 2 is a front perspective view of a modular jack in accordance with one embodiment of the present disclosure.

FIG. 2 is a front perspective view of a modular jack 200 in accordance with one embodiment of the present disclosure. The modular jack 200 includes a housing 202, a receptacle 204 configured to receive a complementary modular plug (e.g., a plug, not shown, coupled to a CAN bus), and a plurality of contacts 110, or pins, such as Pins 1-8 shown and described above with respect to FIG. 1. Included among the plurality of contacts 110 are Pins 1 and 2, indicated at 206 and 208, respectively. As will be understood by one of skill in the art, the contacts 110 are arranged to connect to respective complementary contacts in the modular plug when the plug is installed in the receptacle 204.

Figure 3A:
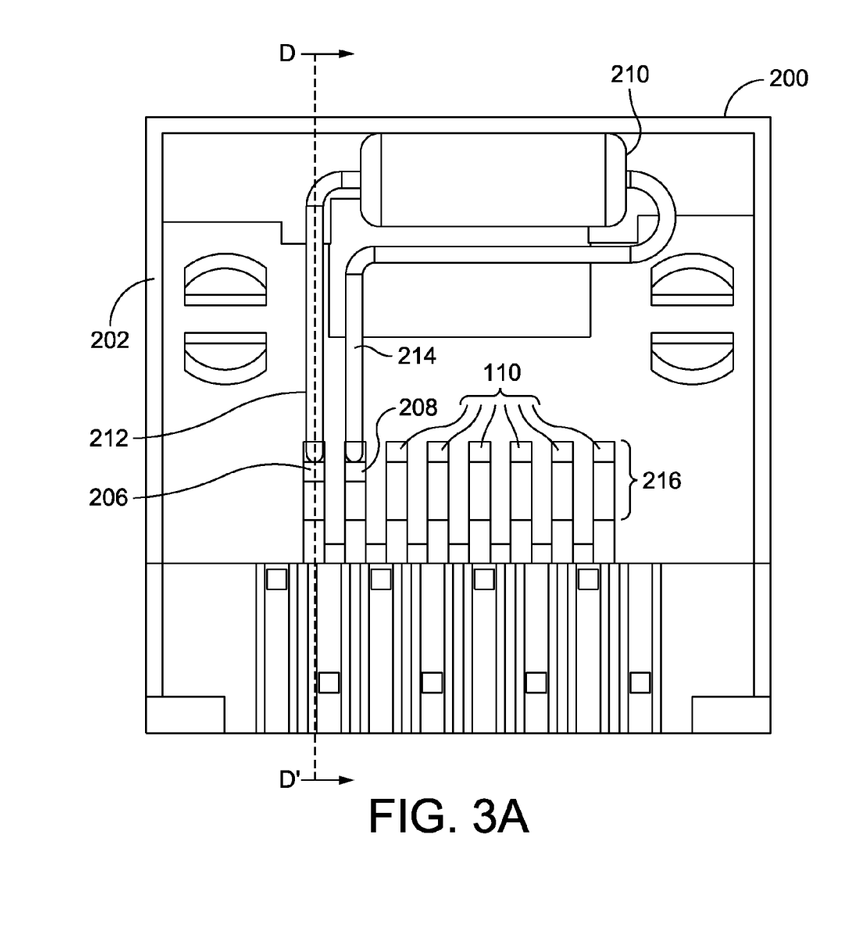
FIG. 3A is a rear elevation view of the modular jack of FIG. 2.
Figure 3B:
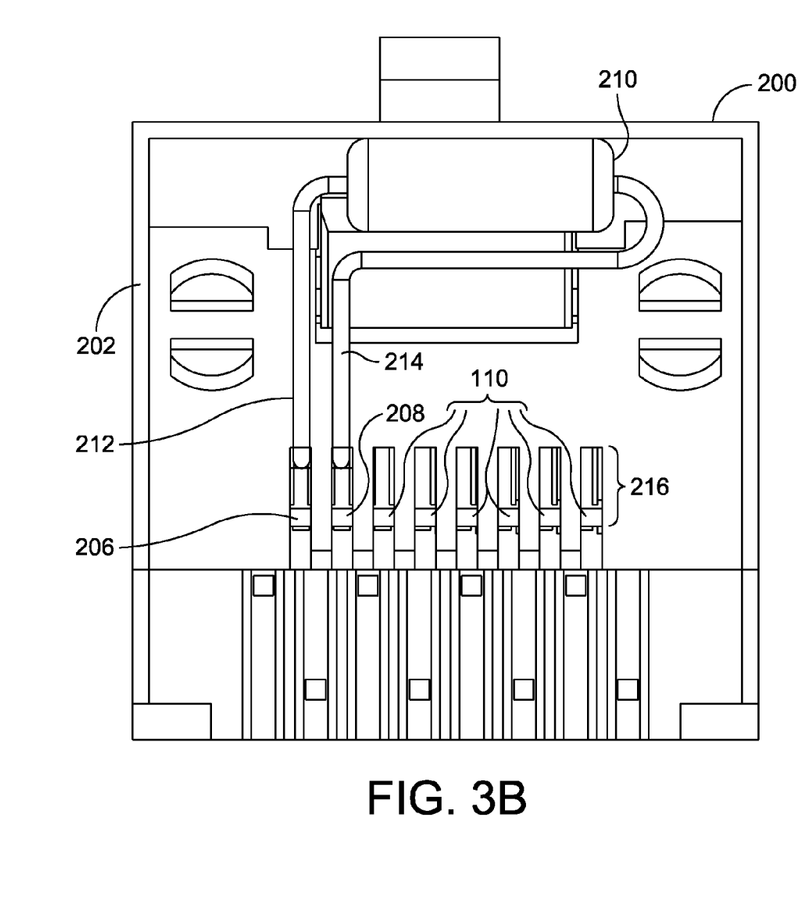
FIG. 3B is a rear elevation view of the modular jack of FIG. 2.

FIGS. 3A and 3B are rear elevation views of the modular jack 200 of FIG. 2, according to one embodiment. The modular jack 200 includes the housing 202 having the plurality of contacts 110 disposed therein, including Pin 1 206 and Pin 2 208. Pin 1 206 is coupled to the CAN High line 102 and Pin 2 is coupled to the CAN Low line 104, such as shown in FIG. 1. Also included in the modular jack 200 is a resistor 210 having two leads 212 and 214. Other resistive elements may be substituted for the resistor 210, for example, the resistive element may be a circuit designed to substantially match the characteristic impedance of the line (such as a CAN bus communication line or other type of communication line). In some embodiments, the leads 212 and 214 may be implemented as pads of a surface mounted resistor. The resistor 210 may be mounted to the housing 202, or located separately from the modular jack 200. As illustrated in FIG. 3A, the modular jack 200 is configured such that the resistor leads 212 and 214 are each electrically coupled to Pin 1 206 and Pin 2 208 respectively when the receptacle 204 is empty (such as shown in FIG. 2). Each of the contacts 110, including Pin 1 206 and Pin 2 208, are shown in a first position at the upper end of respective openings 216 (for clarity, only one opening 216 is indicated in FIGS. 3A and 3B). In the first position, Pin 1 206 is in electrical contact with the resistor lead 212, and Pin 2 208 is in electrical contact with the resistor lead 214. Accordingly, when the receptacle 204 is empty, Pin 1 206 is electrically coupled to Pin 2 208 through the resistor 210, thereby resistively terminating the CAN bus.

As shown in FIG. 3B, the modular jack 200 is further configured such that the resistor leads 212 and 214 are either or both electrically isolated from Pin 1 206 and/or Pin 2 208 when a modular plug (not shown) is installed in the receptacle 204. Each of the contacts 110, including Pin 1 206 and Pin 2 208, are shown in a second position at the lower end of the respective openings 216. Therefore, in this configuration, Pin 1 206 and Pin 2 208 are physically separated from the resistor leads 212 and 214, respectively, and the CAN bus is not resistively terminated by the resistor 210 of the modular jack 200.

Figure 3C:
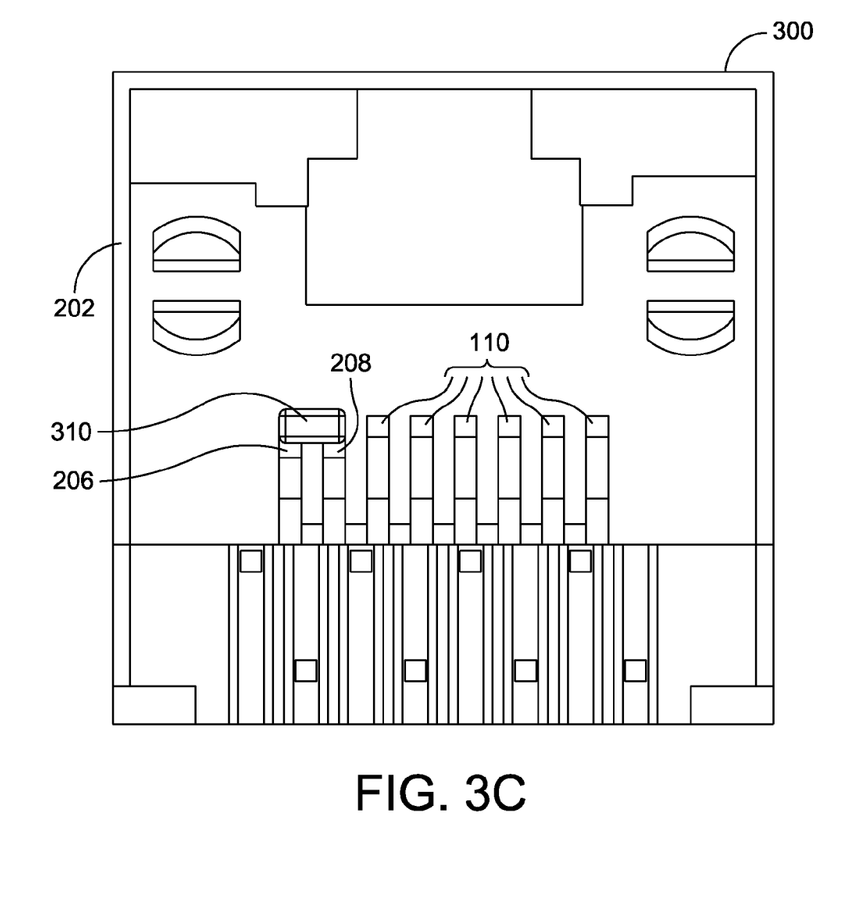
FIG. 3C is a rear elevation view of a modular jack in accordance with another embodiment of the present disclosure.

FIG. 3C is a rear elevation view of a modular jack 300 according to another embodiment, which is substantially the same as the modular jack 200 shown in FIG. 3A except a resistor 310 is, for example, a surface-mount resistor attached to the housing 202. Other resistive elements may be substituted for the resistor 310, for example, the resistive element may be a circuit designed to substantially match the characteristic impedance of the line (such as a CAN bus communication line or other type of communication line). The leads 212 and 214 (not shown in FIG. 3C) may be implemented as pads of the surface-mount resistor and are arranged similarly to those shown in FIG. 3A such that one pad is switchably coupled to Pin 1 206 and the other pad is switchably coupled to Pin 2 208.

Figure 3D:
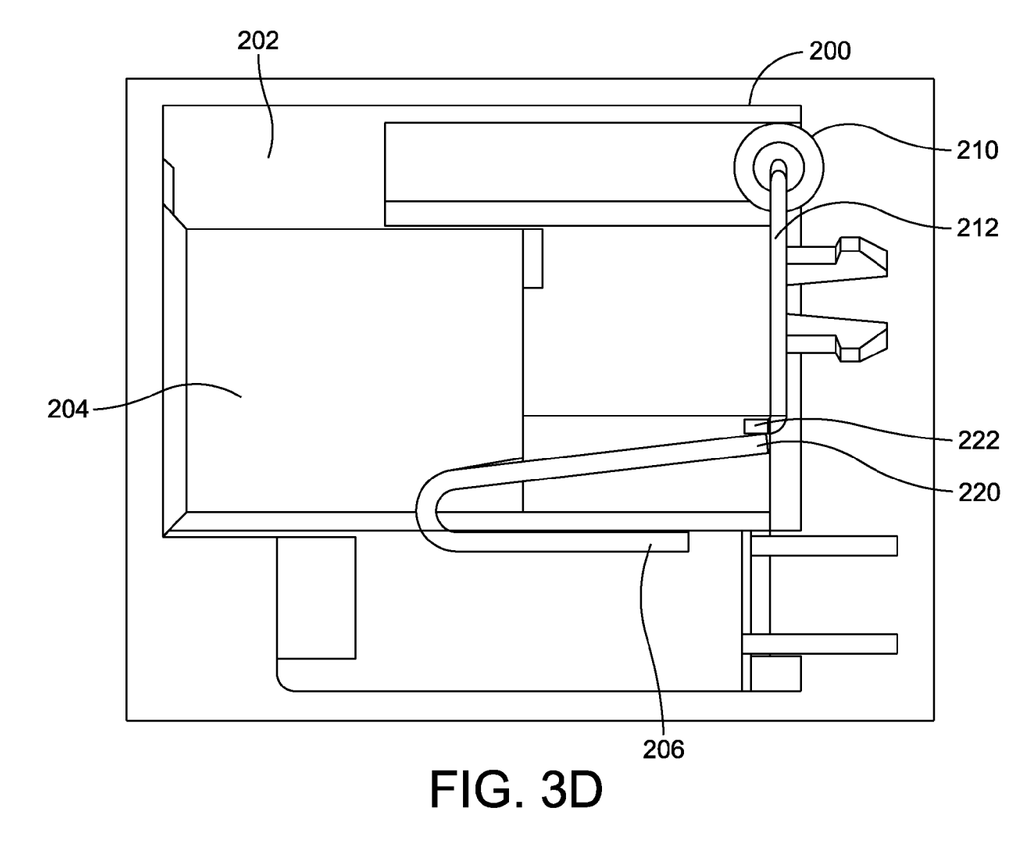
FIGS. 3D and 3E are side cross-sectional views of the modular jack of FIG. 3A along a cut line D-D'.
Figure 3E:
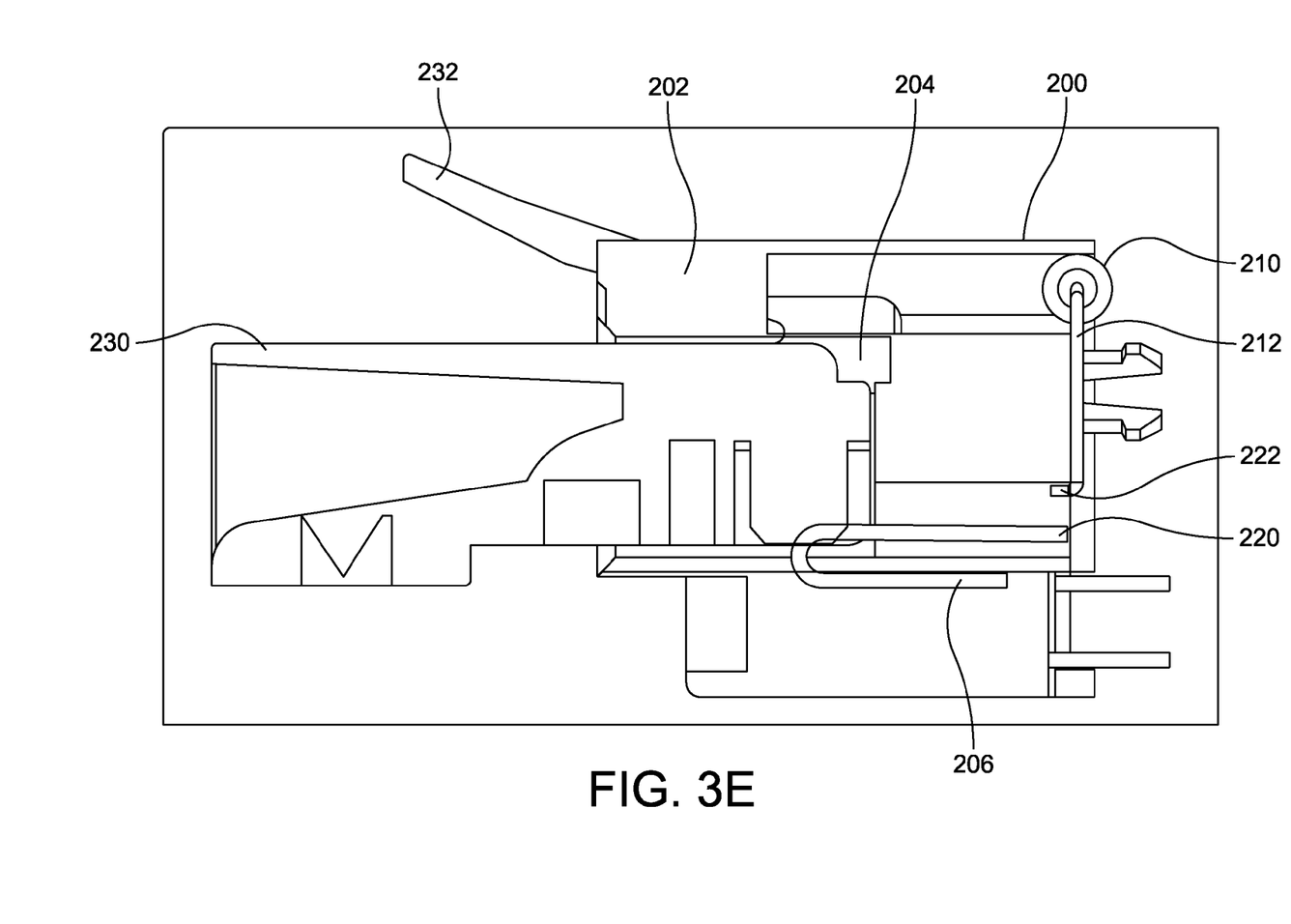

FIGS. 3D and 3E are side cross-sectional views of the modular jack 200 of FIG. 3A along a cut line D-D'. Pin 1 206 (shown) and Pin 2 208 (not shown) are each configured such that one end of each pin (indicated at 220 for Pin 1) is movable between a first position and a second position. In FIG. 3D, the receptacle 204 is empty (i.e., there is no modular plug installed) and Pin 1 206 is shown in the first position, where one end of the pin 220 is coupled to one end of the lead 212 of the resistor 210, as indicated at 222. Pin 1 206 and Pin 2 208 are each configured such that the spring tension of the contact causes the pin end 220 to be pressed upwardly against the lead end 222 when the receptacle 204 is empty.

In FIG. 3E, a modular plug 230 having a releasable locking tab 232 is installed in the receptacle 204. As will be understood by one of skill in the art, the releasable locking tab 232 is configured to lock the modular plug 230 in the receptacle 204, and unlock the plug from the receptacle when the locking tab is depressed. The modular plug 230, when installed, depresses Pin 1 206 such that the pin end 220 moves to the second position. In the second position, Pin 1 206 is not in contact with the lead end 222 of the resistor 210, and thus is electrically isolated from the resistor 210. It should be understood that the configuration of Pin 2 208 is substantially similar with respect to Pin 1 206, as described above.

Figure 4:
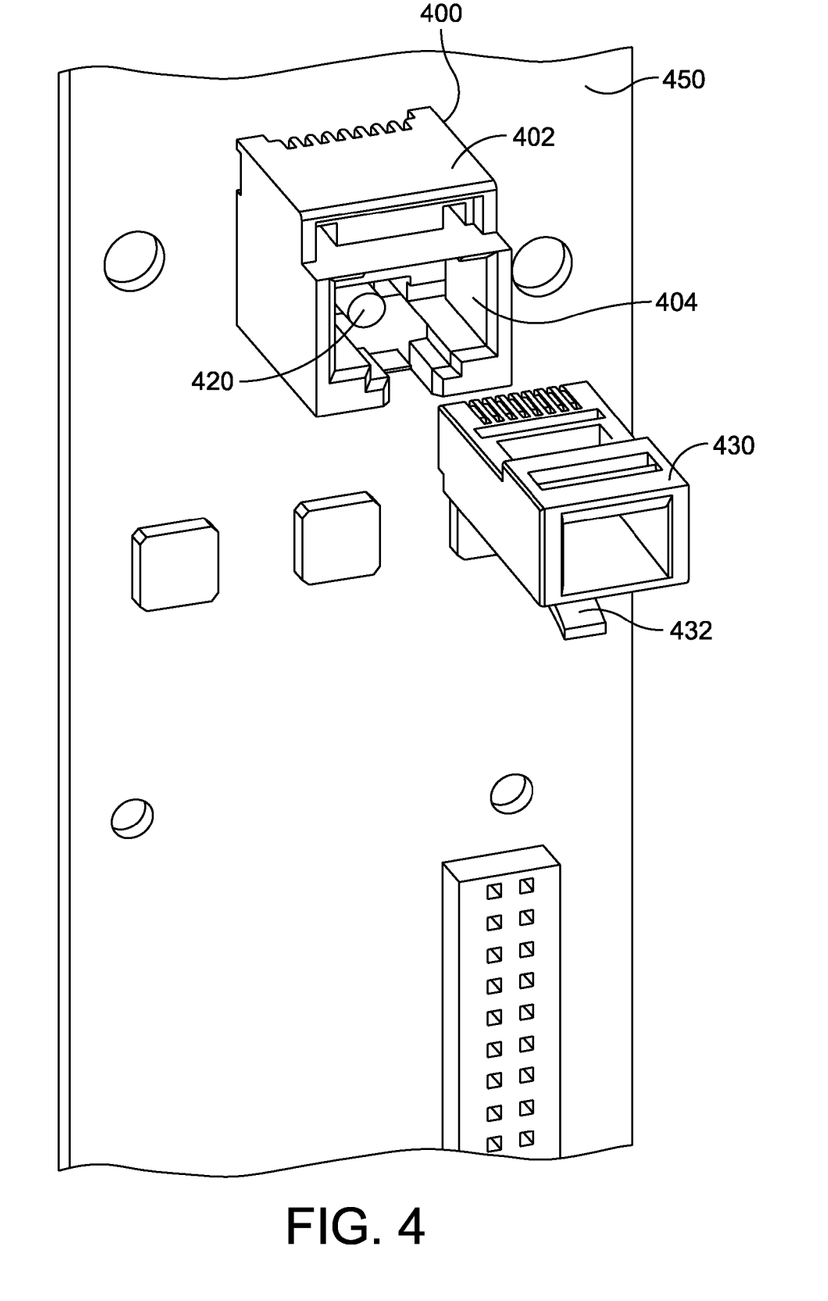
FIG. 4 is a front perspective view of a modular jack in accordance with another embodiment of the present disclosure.

FIG. 4 is a front perspective view of a modular jack 400 according to another embodiment of the present disclosure. The modular jack 400 is shown installed on a substrate 450. The modular jack 400 has a housing 402 with a receptacle 404 configured to receive a complementary modular plug 430 with a releasable locking tab 432. Integrated into the modular jack 400, or mounted elsewhere such as on a printed circuit board, is a switch lever 420 that is mechanically coupled to a switch 422 (not shown in FIG. 4), such as a microswitch. The modular jack 400 is substantially similar to the modular jack 200 of FIG. 3A, except that rather than utilizing spring tension to make or break the connection between the resistor and Pins 1 and 2, the switch is used to open and close a circuit including the resistor and Pins 1 and 2. This is further illustrated below with respect to FIG. 5.

Figure 5:
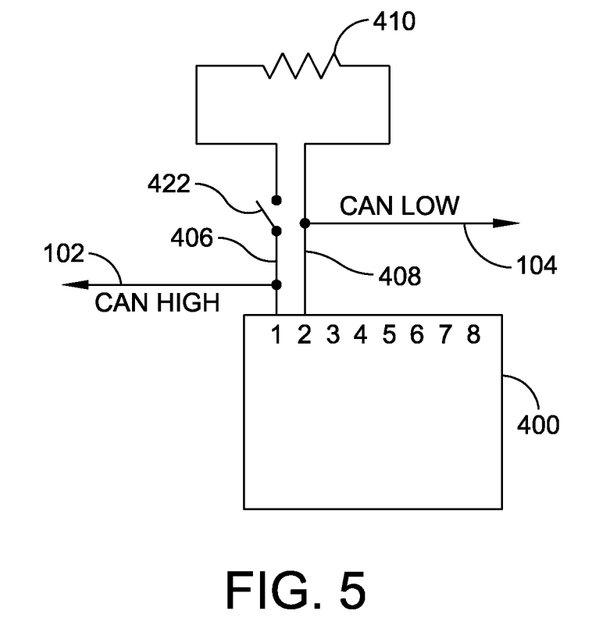
FIG. 5 is a schematic diagram of the modular jack of FIG. 4.

FIG. 5 is a schematic diagram of the modular jack 400 of FIG. 4, showing the switch 422 in series with a resistor 410. The combination of the switch 422 and resistor 410 are coupled at one end to Pin 1 406 of the modular jack 400, and at an opposing end to Pin 2 408. The switch 422 is opened and/or closed by action of the switch lever 420 (shown in FIG. 4) moving in response to installing or removing the modular plug 430 into/from the receptacle 404. For example, when the modular plug 430 is installed in the jack 400, the switch lever 420 is depressed toward the rear of the jack causing the switch 422 to open, and the CAN bus is therefore not terminated at the modular jack 400 because the resistor 410 is not coupled between Pin 1 406 and Pin 2 408. When the receptacle 404 is empty or when the plug 430 is removed from the jack 400, the switch lever 420 is not depressed (and may be, for example, spring loaded such as to cause the lever to extend away from the depressed position) causing the switch to close, and causing the resistor 410 to be coupled between Pin 1 406 and Pin 2 408, thus terminating the CAN bus at the modular jack 400. Other arrangements of the switch lever 420 may be used to open and/or close the switch 422 in response to insertion and removal of the plug to and from the jack 400.

Figure 6:
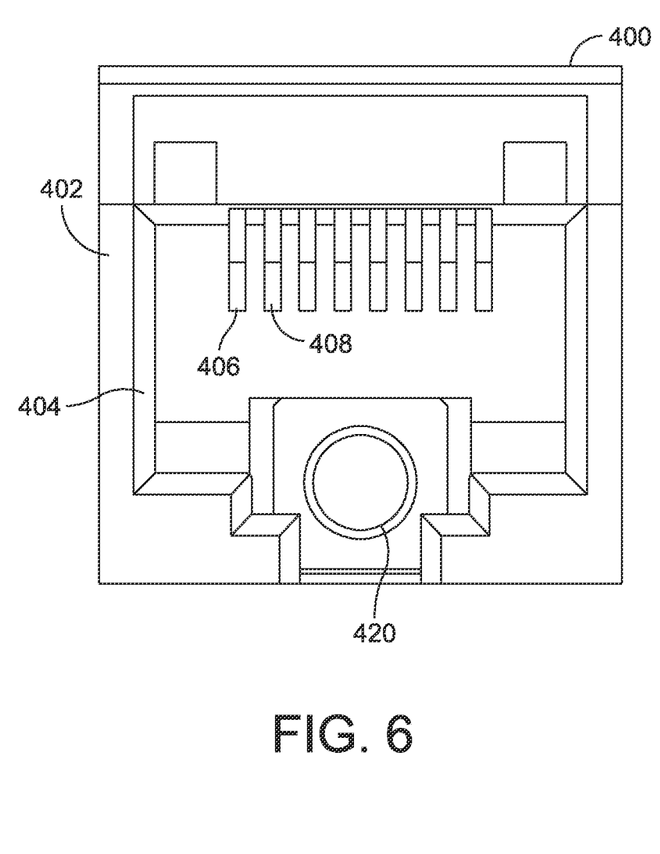
FIG. 6 is a front elevation view of the modular jack of FIG. 4.

FIG. 6 is a front elevation view of the modular jack 400 of FIG. 4, showing another perspective of the housing 402, the receptacle 404, Pin 1 406, Pin 2 408, and the switch lever 420.

According to various embodiments of the present disclosure, several advantages may be realized. For example, use of the automatically terminating modular jack assembly described herein will reduce the potential for human error by automating the previously manual task of installing the termination plugs, as well as eliminating the need for providing separate termination plugs and associated instructions to the end-user. Another advantage is that the modular jack can easily be installed in equipment during manufacture in place of conventional jacks, providing an out-of-the-box solution that does not require additional parts, installation or configuration. Further advantages may be realized.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, according to various embodiments, the resistor may be incorporated into the modular jack assembly, e.g., a surface mount resistor, or the resistor may be located separately from the jack. In another example, any resistive element having the appropriate resistance may be utilized, including a 120-ohm resistor or any electrical circuit designed to match the characteristic impedance of the communication line. In another example, embodiments of the present disclosure may be implemented in a variety of jack configurations, including RJ45 and RJ11. Other non-modular or non-standardized configurations may be used. In one embodiment, the state of the termination (e.g., enabled or disabled) and/or the state of the jack (e.g., plug present in jack, or plug absent from jack) can be passed on to other controllers or circuitry as an input, e.g., so that other actions can be performed based on the state of the termination. Some embodiments of the present disclosure may be implemented within various CAN bus-enabled devices such as data center rack power distribution units, environmental monitoring units, cooling units, and/or uninterruptible power supplies. Accordingly, the foregoing description and drawings are by way of example only.

What is claimed is:

1. A network interface, comprising:
a receptacle configured to receive a plug;
a first contact and a second contact each disposed in the receptacle; and
a combination of a resistive element and a normally closed switch arranged in series with each other, the combination coupled between the first contact and the second contact, the combination having a first configuration in which the switch is opened responsive to a presence of the plug within the receptacle, and a second configuration in which the switch is closed responsive to an absence of the plug from the receptacle, and wherein the combination and the receptacle are configured such that insertion of the plug into the receptacle pushes the switch from closed to open.

2. The network interface of claim 1, wherein the switch includes the first contact, wherein the first contact is movable from a first position to a second position responsive to the presence of the plug within the receptacle, wherein the switch is closed when the first contact is in the first position, and wherein the switch is open when the first contact is in the second position.

3. The network interface of claim 2, wherein the first contact is movable from the second position to the first position responsive to the absence of the plug from the receptacle.

4. The network interface of claim 3, wherein the switch includes the second contact, wherein the second contact is movable from a third position to a fourth position responsive to the presence of the plug within the receptacle, and wherein the second contact is movable from the fourth position to the third position responsive to the absence of the plug from the receptacle.

5. The network interface of claim 1, wherein the switch includes a microswitch.

6. The network interface of claim 1, further comprising a lever coupled to the switch and configured to open the switch responsive to an insertion of the plug into the receptacle.

7. The network interface of claim 6, wherein the lever is further configured to close the switch responsive to a removal of the plug from the receptacle.

8. The network interface of claim 1, wherein the receptacle includes an RJ45 jack.

9. The network interface of claim 1, wherein the resistive element includes a 120-ohm resistor.

10. The network interface of claim 1, wherein the network interface is included in a device configured to communicate on a Controller Area Network (CAN).

11. A network interface, comprising:
a receptacle configured to receive a plug;
a first contact and a second contact each disposed in the receptacle;
a resistive element selectively coupled between the first contact and the second contact for providing resistive termination between the first contact and the second contact; and
means for detecting the presence and absence of the plug in the receptacle, coupling the resistive element between the first contact and the second contact responsive to detecting the absence of the plug, and decoupling the resistive element from at least one of the first contact and the second contact responsive to detecting the presence of the plug by pushing the first and the second contact apart.

12. The network interface of claim 11, further comprising a switch coupled in series to the resistive element for switchably coupling the resistive element between the first contact and the second contact.

13. The network interface of claim 12, wherein the switch includes the first contact, wherein the first contact is movable from a first position to a second position responsive to the presence of the plug within the receptacle, wherein the switch is closed when the first contact is in the first position, and wherein the switch is open when the first contact is in the second position.

14. The network interface of claim 11, wherein the receptacle includes an RJ45 jack.

15. The network interface of claim 11, wherein the resistive element includes a 120-ohm resistor.

16. A method of terminating a communication bus within a network interface, the method comprising:
inserting a plug within a receptacle of the network interface;
disabling resistive termination between a first contact of the receptacle and a second contact of the receptacle responsive to insertion of the plug by pushing the first and second contact apart within the receptacle;
removing the plug from the receptacle; and
enabling resistive termination between the first contact and the second contact upon removal of the plug from within the receptacle.

17. The method of claim 16, wherein disabling resistive termination includes moving the first contact from a first position to a second position responsive to inserting the plug within the receptacle, wherein the first contact in the first position is switchably coupled to a resistive element, and wherein the first contact in the second position is switchably decoupled from the resistive element.

18. The method of claim 17, wherein enabling resistive termination includes moving the first contact from the second position to the first position responsive to removing the plug from the receptacle.

19. The method of claim 16, wherein disabling resistive termination includes mechanically opening a switch coupled in series to a resistive element in response to an insertion of the plug into the receptacle.

20. The method of claim 19, wherein enabling resistive termination includes mechanically closing the switch in response to a removal of the plug from the receptacle.

* * * * *